United States Patent [19]

Riffe

[11] 4,350,908
[45] Sep. 21, 1982

[54] COOLING SYSTEM FOR ROTOR OF A DYNAMOELECTRIC MACHINE

[75] Inventor: Delmar R. Riffe, Murrysville, Pa.

[73] Assignee: Westinghouse Electric Corp., Pittsburgh, Pa.

[21] Appl. No.: 213,694

[22] Filed: Dec. 4, 1980

[51] Int. Cl.³ .............................................. H02K 1/32
[52] U.S. Cl. ......................................... 310/61; 310/45; 310/58
[58] Field of Search .................. 310/54, 52, 58, 59, 310/60 R, 60 A, 61, 64, 65, 261, 262, 43, 45; 277/59

[56]     References Cited
         U.S. PATENT DOCUMENTS

| 2,285,960 | 6/1942 | Fechheimer | 310/54 |
| 2,381,122 | 8/1945 | Fechheimer | 310/61 |
| 2,527,878 | 10/1950 | Fechheimer | 310/54 |
| 3,046,424 | 7/1962 | Tudge | 310/61 |
| 3,056,055 | 9/1962 | Willyoung | 310/61 |
| 3,092,741 | 6/1963 | Horsley | 310/54 |
| 3,131,321 | 4/1964 | Gibbs | 310/54 |
| 3,243,616 | 3/1966 | Tudge | 310/54 |
| 3,393,333 | 7/1968 | Kudlacik | 310/262 |
| 3,493,795 | 2/1970 | Dieterkranz | 310/54 |
| 3,497,734 | 2/1970 | Cuny | 310/54 |
| 3,504,207 | 3/1970 | Tjernström | 310/54 |
| 3,543,062 | 11/1970 | Banchieri | 310/54 |
| 3,629,628 | 12/1971 | Rank | 310/54 |
| 3,652,880 | 3/1972 | Starcevic | 310/54 |
| 3,686,522 | 8/1972 | Konovalov | 310/54 |
| 3,733,502 | 5/1973 | Curtis | 310/61 |
| 3,800,174 | 3/1974 | Butterfield | 310/61 |
| 3,870,913 | 3/1975 | Shapiro | 310/52 |
| 3,895,246 | 7/1975 | Fidei | 310/61 |
| 3,908,140 | 9/1975 | Fidei | 310/54 |
| 3,916,230 | 10/1975 | Albaric | 310/61 |
| 3,955,111 | 5/1976 | Weghaupt | 310/54 |
| 3,968,389 | 7/1976 | Albaric | 310/61 |
| 4,119,872 | 10/1978 | Hunt | 310/61 |
| 4,210,834 | 7/1980 | Weghaupt | 310/61 |

Primary Examiner—R. Skudy
Attorney, Agent, or Firm—F. J. Baehr, Jr.

[57]     ABSTRACT

A disc of insulating material provides conduits for transmitting cooling fluid from a central portion of a rotor of a dynamoelectric machine to and from the rotor windings to the central portion of the rotor and electrically isolating the windings from the central portion of the rotor.

6 Claims, 3 Drawing Figures

COOLING SYSTEM FOR ROTOR OF A DYNAMOELECTRIC MACHINE

BACKGROUND OF THE INVENTION

This invention relates to cooling systems and more particularly to a liquid cooling system for a rotor of a dynamoelectric machine.

The maximum power density that can be obtained in dynamoelectric machinery is to a large extent limited by the ability to remove waste heat from the machine. Liquid cooling effectively removes large quantities of heat from such machines, however, to be effective the conductors forming the windings of the machine must either be hollow or be provided with cooling fluid conduits in close proximity to the conductors which results in the conductors being at essentially the same electrical potential as the conductors. The rotors operate at high speeds inducing large centrifugal forces, which adds significantly to the problem of developing a rugged and dependable cooling system which is electrically isolated from the windings.

SUMMARY OF THE INVENTION

A cooling system for a rotor of a dynamoelectric machine, when made in accordance with this invention, comprises at least one duct for cooling fluid disposed within the central portion of the rotor, a plurality of conduits for cooling fluid disposed in the peripheral portion of the rotor. The rotor also has a plurality of steps disposed on the central portion thereof and a disc formed from an insulating material has a central bore and a counterbore which has a diameter and depth to register with one of the steps. A plurality of ports are disposed in the disc and extend radially therethrough. The ports are in fluid communication with the ducts. A plurality of tubular members are disposed in fluid communication with the ports and with the conduits and seals are disposed at the interface of the bore of the disc and the one step to form a cooling system for the rotor which electrically isolates the central portion of the rotor from the windings.

BRIEF DESCRIPTION OF THE DRAWINGS

The objects and advantages of this invention will become more apparent from reading the following detailed description in conjunction with the following drawings, in which.

DESCRIPTION OF THE PREFERRED EMBODIMENT

Figure 1:
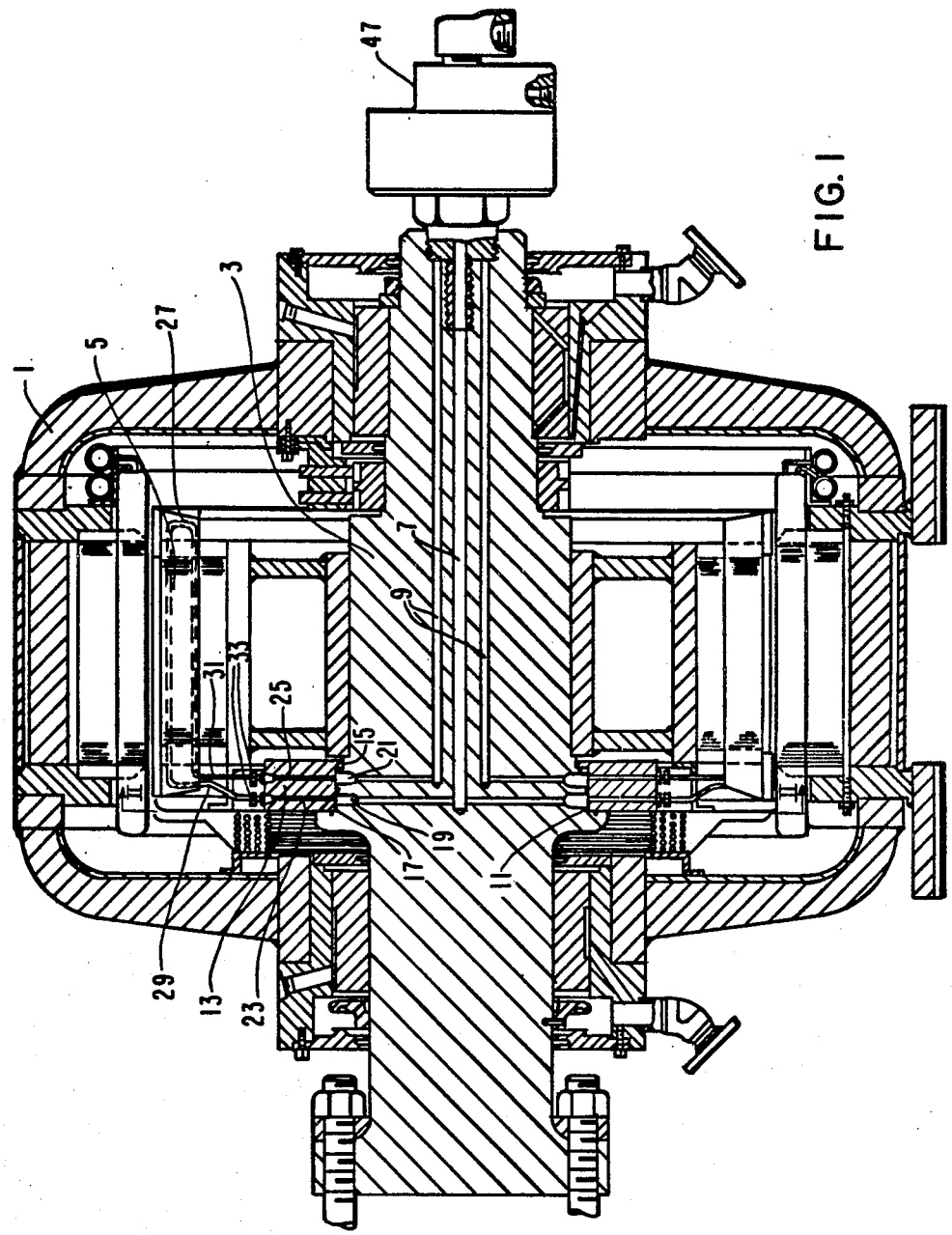
FIG. 1 is a sectional view of a dynamoelectric machine incorporating a cooling system made in accordance with this invention.
Figure 2:
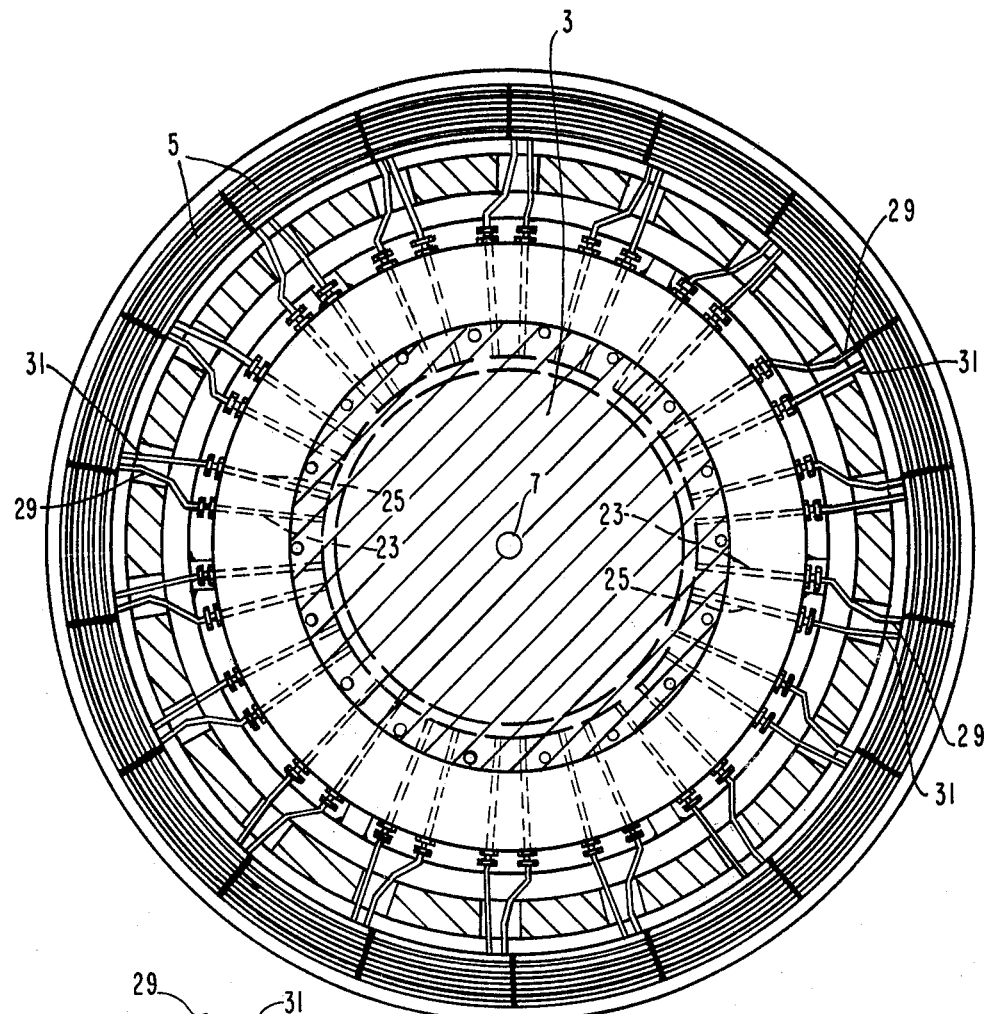
FIG. 2 is a sectional view taken on line II—II of FIG. 1.
Figure 3:
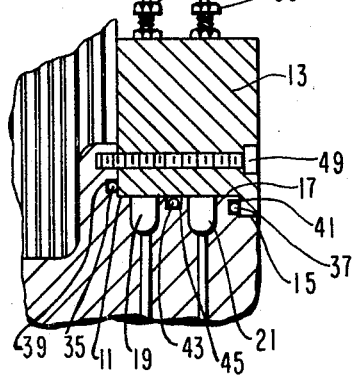
FIG. 3 is an enlarged partial sectional view of a portion shown in FIG. 1.

Referring now to the drawings in detail and in particular to FIG. 1 there is shown a dynamoelectric machine having a stator 1 and a rotor 3 rotatably disposed within the stator 1.

The rotor 3 has windings 5 disposed in the outer periphery thereof. Also disposed within the rotor 3 is a fluid cooling system, which circulates a cooling fluid, preferably a liquid such as water through the rotor and rotor windings.

The cooling system comprises an influent cooling fluid duct 7 and a plurality of effluent cooling fluid ducts 9 disposed within the central portion of the rotor 3. The central portion of the rotor 3 has a plurality of steps 11 disposed adjacent one end thereof. A disc 13 made of an electrical insulating material has a central bore 15 and a counterbore 17 which has a diameter and depth which registers with one of the steps 11 in the central portion of the rotor 3. Circumferential grooves 19 and 21 are disposed at the interface of the counterbore 17 and one of the steps 11 and a plurality of ports 23 and 25 extend radially through the disc and outwardly from each of the circumferential grooves 19 and 21. The ports 23 are in fluid communication with the influent fluid duct 7 via the circumferential groove 19 and the ports 25 are in fluid communication with the effluent cooling duct 9 via the circumferential groove 21.

Disposed within the windings 5 are conduits 27 for the cooling fluid, the conduits 27 may be conductors or separate conduits in close proximity to the conductors. The conduits 27 are connected in fluid communication with the ports 23 and 25 by metallic tubular members 29 and 31, respectively. Compression fittings 33 connect the tubular members 29 and 31, respectively to the ports 23 and 25. O-rings or other sealing means 35 and 37 are disposed circumferentially at the interface of the risers associated with the one step 11 and the disc and include circumferential grooves 39 and 41 disposed, respectively in the risers ascending and descending from the one step 11. An additional O-ring 43 or other sealing means is disposed between the grooves 19 and 21 and at the interface of the tread of the one step 11 and the counterbore 17. A groove 45 for the O-ring is disposed within the riser portion of the step 11. A rotatable fluid coupling 47 is disposed on one end of the rotor in fluid communication with the influent and effluent ducts 7 and 9 for communicating the influent and effluent cooling fluid with non-rotatable influent and effluent pipes.

Fastening means such as socket head cap screws 49 clamp the disc 13 against the risers adjacent the one step 11 compressing the O-rings 35 and 37 to form a liquid seal. The counterbore 17 of the disc is sized to compress the O-ring 43 disposed in the tread of the one step 13 to form a liquid seal therebetween.

What is claimed is:

1. A cooling system for a rotor of a dynamoelectric machine, said cooling system comprising:
   at least one duct for cooling fluid disposed in a central portion of said rotor;
   a plurality of conduits for cooling fluid disposed in windings in peripheral portion of said rotor;
   said rotor having a plurality of steps disposed on the central portion thereof;
   a disc formed from electrical insulating material and having a central bore and a counterbore which has a diameter and depth that registers with one of said steps which has a riser;
   a plurality of ports disposed in said disc and extending radially therethrough;
   said ports being in fluid communication with said duct;
   a plurality of tubular members in fluid communication with said ports and said conduits; and
   sealing means disposed at the interface of said bore in said disc and said riser of said one step to form a cooling system for the rotor which electrically isolates the central portion of the rotor from the windings.

2. The cooling system as set forth in claim 1, wherein the step has ascending and descending risers and the sealing means are disposed at the interface of the risers and the counterbore of the disc.

3. A cooling system as set forth in claim 1, wherein there is at least one duct for influent cooling system in the central portion of the rotor and at least one duct for effluent cooling fluid within the central portion of the rotor.

4. A cooling system as set forth in claim 3 wherein the ports within the disc are disposed in two groups, one group being in fluid communication with the influent cooling duct and the other group being in fluid communication with the effluent cooling duct and the tubular members are in two groups, one group of tubular members being in fluid communication with one group of ports and the other group of cooling members being in fluid communication with the other group of ports.

5. The cooling system as set forth in claim 4 and further comprising a pair of circumferential grooves disposed at the interface of the one step and the counterbore, one groove being in fluid communication with the influent duct and one group of ports within the disc and the other groove being in fluid communication with the effluent duct and other group of ports within the disc.

6. The cooling system as set forth in claim 5 and further comprising sealing means disposed at the interface of the bore of the disc and the one step and disposed between the circumferential grooves.

* * * * *